(12) United States Patent
Drake

(10) Patent No.: US 11,207,613 B2
(45) Date of Patent: *Dec. 28, 2021

(54) METHODS AND APPARATUS FOR COUNTER-CURRENT LEACHING OF FINELY DIVIDED SOLIDS

(71) Applicant: Drake Water Technologies, Inc., Helena, MT (US)

(72) Inventor: Ronald N. Drake, Helena, MT (US)

(73) Assignee: Drake Water Technologies, Inc., Helena, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,548

(22) Filed: Jun. 29, 2020

(65) Prior Publication Data

US 2020/0324222 A1 Oct. 15, 2020

Related U.S. Application Data

(63) Continuation of application No. 15/914,426, filed on Mar. 7, 2018, now Pat. No. 10,737,197, which is a
(Continued)

(51) Int. Cl.
*B01D 11/02* (2006.01)
*B01D 21/24* (2006.01)
(Continued)

(52) U.S. Cl.
CPC ...... *B01D 11/0223* (2013.01); *B01D 11/0242* (2013.01); *B01D 11/0253* (2013.01);
(Continued)

(58) Field of Classification Search
CPC . B01D 11/02; B01D 11/0223; B01D 11/0242; B01D 11/0253; B01D 11/028;
(Continued)

(56) References Cited

U.S. PATENT DOCUMENTS

| | | |
|---|---|---|
| 1,604,649 A | 10/1926 | Manning |
| 1,608,661 A | 11/1926 | Nordell |

(Continued)

OTHER PUBLICATIONS

Savage, Matthew O., "Advisory Action before the Filing of an Appeal Brief re U.S. Appl. No. 11/052,409", dated Dec. 16, 2009, p. 4, Published in: US.

(Continued)

*Primary Examiner* — Joseph W Drodge
(74) *Attorney, Agent, or Firm* — Neugeboren O'Dowd PC

(57) ABSTRACT

This disclosure describes systems, methods, and apparatus for counter-current solids leaching. A multi-stage counter-current leaching chamber can include a top and bottom end, a barren liquor input, two or more regions for countercurrent mixing, and a barren solids output. The input can be configured to receive barren liquor. The two or more regions for countercurrent mixing and separation can be configured to mix and separate liquid and solid phases. The barren solids output can be configured to collect and discharge barren solids from the bottom end of the multi-stage countercurrent leaching chamber. A fluidized bed chamber and clarifier chamber can also be included, where the fluidized bed receives a fluidizable slurry of pregnant solids and the clarifier chamber aids in separating liquids from solids passing from a top of the fluidized bed chamber to the top end of the multi-stage countercurrent leaching chamber.

20 Claims, 3 Drawing Sheets

Related U.S. Application Data continuation of application No. 15/010,890, filed on Jan. 29, 2016, now Pat. No. 9,931,584.

(60) Provisional application No. 62/114,444, filed on Feb. 10, 2015.

(51) Int. Cl.
  *C22B 3/04* (2006.01)
  *C22B 3/22* (2006.01)
  *B01D 21/00* (2006.01)

(52) U.S. Cl.
  CPC ....... *B01D 21/0045* (2013.01); *B01D 21/245* (2013.01); *C22B 3/04* (2013.01); *C22B 3/22* (2013.01)

(58) Field of Classification Search
  CPC ............... B01D 11/0284; B01D 21/00; B01D 21/0039; B01D 21/0042; B01D 21/0045; B01D 21/24; B01D 21/245; B01D 11/0023; C10G 1/04; C10G 1/047; C10G 53/04; C10G 53/08; C10G 73/06; C10G 73/26; C10G 73/40; C10G 73/42; C22B 3/00; C22B 3/02; C22B 3/04; C22B 3/20; C22B 3/22; C22B 3/42; C22B 15/0065; C22B 23/0407; C22B 23/0453; C22B 60/0221
  USPC ....... 196/14.52, 46; 208/177, 187, 299, 301, 208/302, 303, 305; 210/634, 663, 669, 210/670, 675, 800–802, 804, 806, 210/259–263, 264, 265, 511, 513, 521, 210/522; 423/24, 27, 31, 63, 68, 70, 74, 423/86, 112, 131, 139, 150.1, 150.2, 157, 423/181, 205, 208, 658.5
  See application file for complete search history.

(56) References Cited

U.S. PATENT DOCUMENTS

| | | |
|---|---|---|
| 1,707,302 A | 4/1929 | Godsey |
| 1,740,199 A | 12/1929 | Nordell |
| 2,222,828 A | 11/1940 | Guthrie |
| 2,273,557 A | 2/1942 | Bonotto |
| 2,556,480 A | 6/1951 | Miller |
| 2,585,491 A | 2/1952 | Olsen |
| 2,585,492 A | 2/1952 | Olsen |
| 2,614,133 A | 10/1952 | Ockert |
| 2,631,727 A | 3/1953 | Cichelli |
| 2,666,500 A | 1/1954 | Cahn et al. |
| 2,671,714 A | 3/1954 | McIlhenney et al. |
| 2,673,176 A | 3/1954 | Whitney |
| 2,679,539 A | 5/1954 | McKay |
| 2,696,304 A | 10/1954 | Gilmore |
| 2,696,305 A | 12/1954 | Slover |
| 2,731,149 A | 1/1956 | Findlay |
| 2,735,795 A | 2/1956 | Weiss et al. |
| 2,744,840 A | 5/1956 | Daniels et al. |
| 2,767,140 A | 10/1956 | Fitch |
| 2,773,028 A | 12/1956 | Monet |
| 2,815,322 A | 12/1957 | Higgins |
| 2,852,464 A | 9/1958 | Nordell |
| 2,863,829 A | 12/1958 | Henke et al. |
| 2,866,827 A | 12/1958 | Jurgeleit et al. |
| 2,881,127 A | 4/1959 | Hetzel |
| 2,951,036 A | 8/1960 | Bodkin et al. |
| 2,959,542 A | 11/1960 | Pye et al. |
| 2,963,431 A | 12/1960 | Dorn et al. |
| 2,985,589 A | 5/1961 | Broughton et al. |
| 3,002,922 A | 10/1961 | Baddour |
| 3,019,079 A | 1/1962 | Donohue |
| 3,043,771 A | 7/1962 | Bloch |
| 3,071,450 A * | 1/1963 | Martin .................... C01D 3/08 423/179 |
| 3,084,120 A | 4/1963 | Cecil et al. |
| 3,152,072 A | 10/1964 | Yomiyama et al. |
| 3,193,498 A | 7/1965 | Platzer et al. |
| 3,200,067 A | 8/1965 | Levendusky |
| 3,201,491 A | 8/1965 | Stine et al. |
| 3,207,577 A | 9/1965 | Mizuma |
| 3,215,624 A | 11/1965 | Frazer et al. |
| 3,231,492 A | 1/1966 | Stine et al. |
| 3,264,099 A | 8/1966 | Johnson |
| 3,268,605 A | 8/1966 | Boyd, Jr. |
| 3,298,950 A | 1/1967 | Mindler |
| 3,311,552 A | 3/1967 | Staats |
| 3,378,339 A | 4/1968 | Yamashiki |
| 3,403,097 A | 9/1968 | Yamashiki et al. |
| 3,446,357 A | 5/1969 | Gomella |
| 3,605,975 A | 9/1971 | Brimhall |
| 3,607,740 A | 9/1971 | Akeroyd |
| 3,679,581 A | 7/1972 | Kunz |
| 3,956,115 A | 5/1976 | Arion |
| 3,993,562 A | 11/1976 | Kashiwabara et al. |
| 4,035,292 A | 7/1977 | Himsley |
| 4,070,281 A | 1/1978 | Tagashira et al. |
| 4,085,042 A | 4/1978 | Misumi et al. |
| 4,087,357 A | 5/1978 | Barrett et al. |
| 4,088,563 A | 5/1978 | Marquardt |
| 4,177,144 A | 12/1979 | Hickey et al. |
| 4,181,605 A | 1/1980 | Braswell |
| 4,202,737 A | 5/1980 | Shimizu |
| 4,228,001 A | 10/1980 | Carlson |
| 4,229,292 A | 10/1980 | Mori et al. |
| 4,246,355 A | 1/1981 | Bolto et al. |
| 4,279,755 A | 7/1981 | Himsley |
| 4,412,866 A | 11/1983 | Schoenrock et al. |
| 4,412,923 A | 11/1983 | Capitani et al. |
| 4,427,639 A | 1/1984 | Himsley |
| 4,448,693 A | 5/1984 | Kiehling et al. |
| RE31,687 E | 9/1984 | Himsley |
| 4,563,337 A | 1/1986 | Kim |
| 4,604,209 A | 8/1986 | Himsley |
| 4,645,595 A | 2/1987 | Kim et al. |
| 4,652,352 A | 3/1987 | Saieva |
| 4,661,258 A | 4/1987 | Phillips |
| 4,693,818 A | 9/1987 | Terrien et al. |
| 4,740,310 A | 4/1988 | Dickey |
| 4,775,484 A | 10/1988 | Schmidt et al. |
| 4,808,317 A | 2/1989 | Berry et al. |
| 4,842,744 A | 6/1989 | Schade |
| 4,864,012 A | 9/1989 | Britt |
| 4,906,361 A | 3/1990 | Arnaud |
| 4,923,615 A | 5/1990 | Mehmet |
| 4,923,616 A | 5/1990 | Hirata |
| 5,049,266 A | 9/1991 | Gotz et al. |
| 5,066,371 A | 11/1991 | DeVoe et al. |
| 5,124,043 A | 6/1992 | Arnaud |
| 5,126,056 A | 6/1992 | Carlson |
| 5,156,736 A | 10/1992 | Schoenrock |
| 5,230,794 A * | 7/1993 | Heijnen ............. B01D 21/2444 210/188 |
| 5,232,953 A | 8/1993 | Johnson |
| 5,250,273 A | 10/1993 | Hornsey et al. |
| 5,531,902 A | 7/1996 | Gallup |
| 5,534,153 A | 7/1996 | Scott et al. |
| 5,547,551 A | 8/1996 | Bahar et al. |
| 5,580,445 A | 12/1996 | Iwatsuka et al. |
| 5,580,461 A | 12/1996 | Cairns et al. |
| 5,614,100 A | 3/1997 | Gallup |
| 5,616,241 A | 4/1997 | Khudenko |
| 5,707,514 A | 1/1998 | Yamasaki et al. |
| 5,736,052 A | 4/1998 | Concklin |
| 5,772,891 A | 6/1998 | Yamasaki et al. |
| 6,004,455 A | 12/1999 | Rendall |
| 6,059,974 A | 5/2000 | Scheurman, III |
| 6,228,257 B1 | 5/2001 | Arnaud |
| 6,334,956 B1 | 1/2002 | Hanemaaijer |
| 6,340,427 B1 | 1/2002 | Fukui et al. |
| 6,375,851 B1 | 4/2002 | Sterling et al. |
| 6,531,058 B1 | 3/2003 | Josse et al. |

(56) References Cited

U.S. PATENT DOCUMENTS

| | | | |
|---|---|---|---|
| 6,563,010 B1 | 5/2003 | Liepa | |
| 6,576,137 B1 | 6/2003 | Ma | |
| 6,716,344 B1 | 4/2004 | Bassi et al. | |
| 7,368,059 B2 | 5/2008 | Drake | |
| 7,524,415 B2* | 4/2009 | Beaulieu | B01D 21/0012 |
| | | | 210/207 |
| 7,862,715 B2 | 1/2011 | Drake | |
| 8,721,894 B2 | 5/2014 | Drake | |
| 9,643,862 B2 | 5/2017 | Drake | |
| 9,931,584 B2 | 4/2018 | Drake | |
| 10,737,197 B2* | 8/2020 | Drake | B01D 11/0242 |
| 2003/0057152 A1* | 3/2003 | Haridas | C02F 3/301 |
| | | | 210/603 |
| 2010/0133196 A1* | 6/2010 | Khudenko | B01D 24/06 |
| | | | 210/668 |
| 2011/0257788 A1* | 10/2011 | Wiemers | C02F 1/42 |
| | | | 700/267 |
| 2012/0094364 A1 | 4/2012 | Lali et al. | |
| 2013/0001136 A1 | 1/2013 | Adeyinka et al. | |
| 2013/0331632 A1 | 12/2013 | Drake | |
| 2016/0230483 A1 | 8/2016 | Drake | |

OTHER PUBLICATIONS

O'Dowd, Sean R., "Appeal Brief Under 37 CFR 41.37 re U.S. Appl. No. 11/052,409", dated May 7, 2010, p. 37, Published in: US.

O'Dowd, Sean R., "Grounds of Rejection to be Reviewed on Appeal for the Appeal Brief Previously Submitted on May 7, 2010 Under 37 CFR 41.37", dated Jun. 19, 2010, p. 5, Published in: US.

Philar, Ravi, "Office Action in re Canadian Patent Application 2,555,292", dated Mar. 22, 2012, p. 2, Published in: CA.

Philar, Ravi, "Office Action re Canadian Patent Application 2,555,292", dated May 16, 2011, p. 3, Published in: CA.

Dekleine, Geoffrey, "Response to Office Action in re Canadian Patent Application 2,555,292", dated Mar. 22, 2012, p. 2, Published in: CA.

Dekleine, Geoffrey, "Response to Office Action in re Canadian Patent Application 2,555,292", dated Nov. 16, 2011, p. 7, Published in: CA.

Lowe, Delores, "Notification of Non-Compliant Appeal Brief", dated May 21, 2010, p. 4, Published in: US.

Drodge, Joseph W, "Office Action Regarding U.S. Appl. No. 15/914,426", dated Aug. 21, 2019, p. 44, Published in: US.

Drodge, Joseph W., "Final Office Action Regarding U.S. Appl. No. 15/914,426", dated Feb. 28, 2020, p. 11, Published in: US.

Gruber, Stephen, "Response to Final Action Regarding U.S. Appl. No. 15/914,426", dated Mar. 26, 2020, p. 8, Published in: US.

Savage, Matthew O., "Office Action re U.S. Appl. No. 12/983,296", dated Jan. 2, 2013, p. 8, Published in: US.

Savage, Matthew O., "Office Action re U.S. Appl. No. 12/983,296", dated Apr. 9, 2013, p. 25, Published in: US.

Savage, Matthew O., "Office Actioin re U.S. Appl. No. 12/983,926", dated Nov. 5, 2013, p. 12, Published in: US.

Gruber, Stephen S., "Response to Office Action re U.S. Appl. No. 12/983,296", dated Jan. 17, 2014, p. 9, Published in: US.

Gruber, Stephen S., "Response to Office Action re U.S. Appl. No. 12/983,296", dated Jan. 28, 2013, p. 8, Published in: US.

Gruber, Stephen S., "Response to Office Action re U.S. Appl. No. 12/983,296", dated May 29, 2013, p. 14, Published in: US.

Gruber, Stephen, "Response to Office Action Regarding U.S. Appl. No. 15/914,426", dated Jan. 20, 2020, p. 10, Published in: US.

Savage, Matthew O., "Office Action in re U.S. Appl. No. 11/052,409", dated Mar. 11, 2009, p. 10, Published in: US.

Savage, Matthew O., "Office Action in re U.S. Appl. No. 11/052,409", dated Jul. 16, 2008, p. 13, Published in: US.

Savage, Matthew O., "Office Action in re U.S. Appl. No. 11/052,409", dated Sep. 28, 2007, p. 7, Published in: US.

Savage, Matthew O., "Final Office Action in re U.S. Appl. No. 11/052,409", dated Oct. 7, 2009, p. 12, Published in: US.

O'Dowd, Sean R., "Pre-Appeal Brief Request for Review re U.S. Appl. No. 11/052,409", dated Jan. 7, 2010, p. 12, Published in: US.

Smith, Duane, "Notice of Panel Decision from Pre-Appeal Brief Review", dated Jan. 27, 2010, p. 3, Published in: US.

O'Dowd, Sean R., "Response to Office Action dated Sep. 28, 2007 re U.S. Appl. No. 11/052,409", dated Jan. 5, 2008, p. 15, Published in: US.

O'Dowd, Sean R., "Response to Office Action dated Mar. 11, 2009 re U.S. Appl. No. 11/052,409", dated Jul. 10, 2009, p. 23, Published in: US.

O'Dowd, Sean R., "Response to Final Office Action dated Oct. 7, 2009 re U.S. Appl. No. 11/052,409", dated Dec. 7, 2009, p. 21, Published in: US.

O'Dowd, Sean R., "Response to Office Action dated Jul. 16, 2008 re U.S. Appl. No. 11/052,409", dated Dec. 16, 2008, p. 18, Published in: US.

Drake, Ron, "Inventor Supplemental Declaration", dated Dec. 16, 2009, p. 2, Published in: US.

* cited by examiner

METHODS AND APPARATUS FOR COUNTER-CURRENT LEACHING OF FINELY DIVIDED SOLIDS

CLAIM OF PRIORITY UNDER 35 U.S.C. § 120

The present Application for Patent is a continuation of patent application Ser. No. 15/914,426 entitled "METHODS AND APPARATUS FOR COUNTER-CURRENT LEACHING OF FINELY DIVIDED SOLIDS" filed Mar. 7, 2018 which is a continuation of patent application Ser. No. 15/010,890 entitled "METHODS AND APPARATUS FOR COUNTER-CURRENT LEACHING OF FINELY DIVIDED SOLIDS" filed Jan. 29, 2016 and issued on Apr. 3, 2018 as U.S. Pat. No. 9,931,584, which claims priority to Provisional Application No. 62/114,444 entitled "METHODS AND APPARATUS FOR COUNTER-CURRENT LEACHING OF FINELY DIVIDED SOLIDS" filed Feb. 10, 2015, and assigned to the assignee hereof and hereby expressly incorporated by reference herein.

FIELD OF THE INVENTION

The present disclosure relates generally to solid waste treatment. In particular, but not by way of limitation, the present disclosure relates to systems, methods and apparatuses for separation and removal of soluble species from insoluble, finely divided dry solids, or finely divided solids present in the form of paste, sludge, or slurry.

BACKGROUND OF THE INVENTION

Drilling for oil and gas produces large quantities of drill cuttings and drilling fluids that are comprised of mixtures of finely divided solids (silt, clay, pulverized formation minerals, barite, etc.) that are often saturated with, or suspended in, salt brine and/or organic liquid. These drilling residues require expensive disposal to protect human health and the environment.

When deposited on the landscape or simply buried, drilling residues pose unacceptable environmental hazards due to leaching of salt and organic species by water from natural precipitation that leads to ground- and surface water contamination. Attempts to stabilize drilling residue by addition of fly-ash, cement kiln dust, or other solidifying agents before burial, also have proven ineffectual and unsatisfactory largely because the salts and organic species remain leachable. Consequently, the current primary means of disposal of drilling residues is solidification, transport, and disposal in a hazardous waste landfill.

Solidification of oily drilling residues is most often accomplished by centrifugation or thermal desorption to remove the organic phase. Residual solids from centrifugation contain both leachable organic and inorganic (salt) species. Residual solids from thermal desorption also contain leachable salts. These solidified residues cannot be land-disposed on-site and must, instead, be transported and disposed at a hazardous waste landfill incurring substantial additional costs.

Solidification of drilling residues comprised of brine muds and cuttings is most often accomplished by addition of drying agents such as fly-ash or cement kiln dust. These means of solidification of drilling residue increase both the mass and volume of material that must be transported and disposed in a landfill, which increases both transportation and disposal costs.

In order to avoid the expense and liabilities associated with transportation and landfilling of hazardous drilling residues, it is desirable to render said residues suitable for land-spreading or other means of on-site disposal. On-site disposal of drilling residues requires means to separate soluble or leachable salts from finely divided dry solids or finely divided solids present in the form of paste, sludge, or slurry.

Those skilled in the art will recognize that the greatest impediment to efficient leaching or washing of fine solids is caused by the amount of interstitial liquor present in saturated fine sediments and the difficulty of separating said interstitial liquor from the surrounding fine solids.

Settled, saturated fine solids derived from drilling with salt brine muds exhibit void fractions in the range from about 40% to 55% yielding mass fractions of interstitial liquid in the range from about 20% to 35% depending on solids particulate density and concentration of salt in the interstitial liquor. If the salt concentration in the interstitial liquor is near saturation, say 24% by mass, then batch-wise washing or dilution with fresh water implies consumption of very large quantities of salt-free water in order to render saturated solids containing acceptably low concentrations (<1,000 mg/kg) of salt as required for on-site disposal.

For example, if an aliquot of saturated cuttings exhibiting a settled void volume of 40% is washed with a void volume of salt free water, the settled residue after washing will exhibit interstitial fluid having one-half the initial concentration of salt. Each successive washing stage will reduce the concentration of salt in the interstitial fluid by half again. Therefore, it would require 7 stages of washing, settling and decanting to reduce the concentration of salt from saturation (240,000 mg/L) to below 2,000 mg/L in the final interstitial fluid. Total wash water consumption would be 2.8 volumes per volume of saturated solids treated.

For on-site treatment, where fresh water needs to be transported to the site, using minimum wash water is an economic and logistical imperative. Analysis shows that the total amount of wash water needed to achieve a specified degree of salt removal is inversely proportional to the number of washing stages used. Furthermore, the minimum mass ratio of wash water to solids treated for a specified degree of salt removal is achieved by using a true counter-current, multistage, contacting regime. An additional advantage of using minimum wash water is that lower volumes of higher-concentration pregnant liquor are produced. Since high concentration dense brine has value in the oil field, the counter-current cuttings leaching system has the potential to greatly reduce disposal costs, or produce a merchantable product from drilling residues.

Disclosed herein are methods and apparatus for accomplishing true counter-current, multistage, washing and leaching, to remove soluble salts from finely divided dry solids, or finely divided solids present in the form of paste, sludge, or slurry, while producing a low volume of high concentration pregnant liquor for re-use or sale.

Those skilled in the art will recognize that disclosed methods and apparatus may be applied to other industrial separations, including but not limited to, decontamination of soils, mineral and ore beneficiation, recovery of fertilizer values from cement kiln dust, recovery of chemical values from waste solids, regeneration of ion exchange resins and adsorption media, and performing numerous liquid/solid and liquid/liquid extractions.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as an apparatus for leaching fine solids. The apparatus can include a multi-stage countercurrent leaching chamber having: a top end; a bottom end; a barren liquor input configured to receive barren liquor; two or more regions for countercurrent mixing and separation of liquid and solid phases; and a barren solids output configured to collect and discharge barren solids from the bottom end of the multi-stage countercurrent leaching chamber. The apparatus can also include a fluidized bed chamber with a top and bottom end, and joined at its top end with the top end of the multi-stage countercurrent leaching chamber, the fluidized bed chamber including a pregnant solids input configured to receive a fluidizable slurry of pregnant solids. The apparatus can further include a clarifier chamber with a top and a bottom end, and joined at its bottom to the top end of the multi-stage countercurrent leaching chamber and the top end of the fluidized bed chamber.

Other embodiments of the disclosure may be characterized as a method for leaching fine solids. The method can include receiving barren liquor and pregnant solids near a bottom of a fluidized bed to form a mixture. The method can also include fluidizing the mixture to form a fluidized mixture that moves toward a top of the fluidized bed. The method can yet further include the fluidized mixture entering a region near a top of the fluidized bed that is shared with a top of a multi-stage countercurrent leaching chamber, the region having a larger cross section than a cross section of either the fluidized bed or the multi-stage countercurrent leaching chamber alone. Yet further, the method can include receiving a leach or wash solution near a bottom of the multi-stage countercurrent leaching chamber. Additionally, the method can include allowing the pregnant solids to descend within the multi-stage countercurrent leaching chamber via the force of gravity. Yet further, the method can include separating solids and liquids via multiple mixing and separating stages of the multi-stage countercurrent leaching chamber. Moreover, the method can include collecting and discharging barren solids from a bottom of the multi-stage countercurrent leaching chamber. Finally, the method can include collecting and discharging pregnant liquor from a clarifier arranged atop both the fluidized bed and the multi-stage countercurrent leaching chamber.

BRIEF DESCRIPTION OF FIGURES

Various objects and advantages and a more complete understanding of the present disclosure are apparent and more readily appreciated by referring to the following detailed description when taken in conjunction with the accompanying drawings.

DETAILED DESCRIPTION

Figure 1:
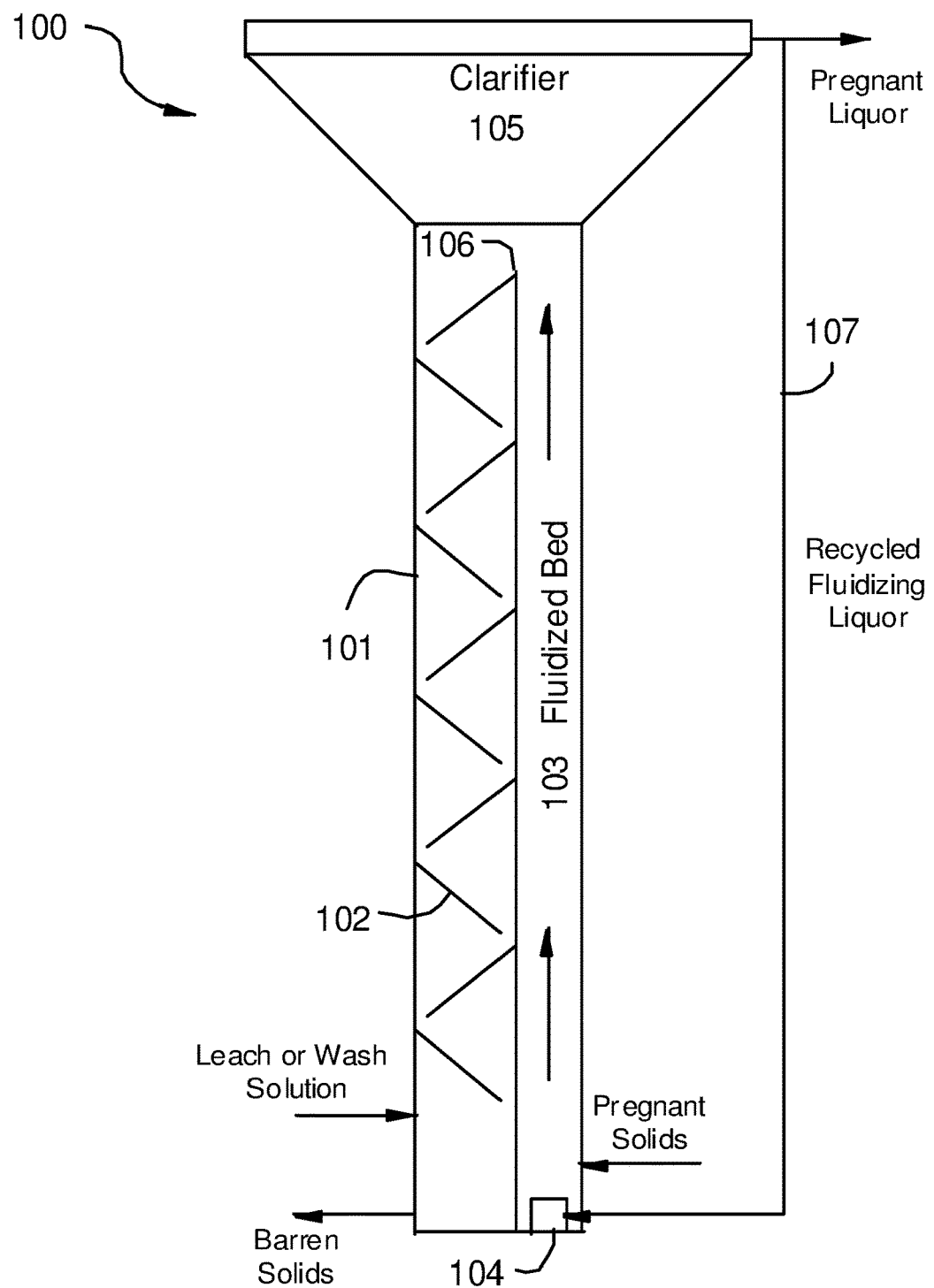
FIG. 1 illustrates one embodiment of a counter-current solids leaching system.

FIG. 1 shows one embodiment of a counter-current flow, solids leaching system 100 comprised of a multistage leaching chamber 101 fitted with inter-stage thickener plates 102, and separated from a fluidized bed 103 by a vertical overflow weir 106. The leaching chamber 101 and fluidized bed 103 are connected at their upper end to a sedimentation clarifier 105.

Pregnant solids are fed to the lower portion of the fluidized bed 103 where they are fluidized by recycled fluidizing liquor that is introduced to the bottom of the fluidized bed chamber via a fluidizing liquor distributor 104. Those skilled in the art will recognize that the fluidizing liquor distributor 104, without limitation, may be selected from the group consisting of screens, perforated plates, perforated tubes, sintered metal or plastic plates, tuyer plates, bubble cap plates, dense media, and open tubes.

Fluidized solids rise vertically in the fluidized bed 103 and are transported to the region of the top of the overflow weir 106 where the superficial velocity of the fluidizing liquor is reduced below the minimum fluidizing velocity for the solids. The reduction in fluidizing velocity occurs as the fluidized bed expands into the increased cross section provided by the combined leaching chamber 101 and fluidized bed 103.

The clarifier 105 further increases the cross section and reduces the upward component of velocity of the up-welling fluidizing liquor such that all but the finest particles settle by gravity into the leaching chamber 101.

Solids slide down the inclined thickener plates 102 to the plate gaps and fall over the plate precipice in a thin sheet. The downward velocity of the falling sheet is much greater than the Stokes settling velocity of any individual particle in the sheet. The falling sheet of solids is intercepted by counter flowing leach or wash solution, having a substantial horizontal streamline component. The wash water partially fragments the falling sheet of solids and pushes it toward the outside wall of the leaching chamber 101. Near the wall, the wash solution streamline is forced back to upward vertical, creating a shear zone, in the thickener plate gap, between the falling and fragmenting sheet of solids and the rising wash water stream. Some of the falling solids are re-entrained by the upward flow of wash water and are carried into the interstitial volume above the plate.

The interstitial volume above each thickener plate 102 receives solids falling from the plate above and solids re-entrained by the wash water moving through the plate gap from below. In the interstitial volume above the plate, wash water moves in a substantially horizontal streamline across the column, to the opposing gap, and above the bulk of the disbursed solids. This promotes settling and transport of solids down the plate. Sweep flock settling is the predominant mechanism in this region, with larger flocks and particles, carrying finer materials downward to the thickener plate and occluding them in the sheet discharge. In this manner, the concentration of solids in the region above the plate increases until the settling, transport, and sheet discharge reach steady state equilibrium with the sludge solids feed rate. Each stage provides a turbulent contact zone and a quiescent settling zone. Downward transport of particles is not governed by Stokes law, and the solids loading to the pregnant liquor discharge is determined by the dimensions of the sedimentation clarifier 105.

Figure 2:
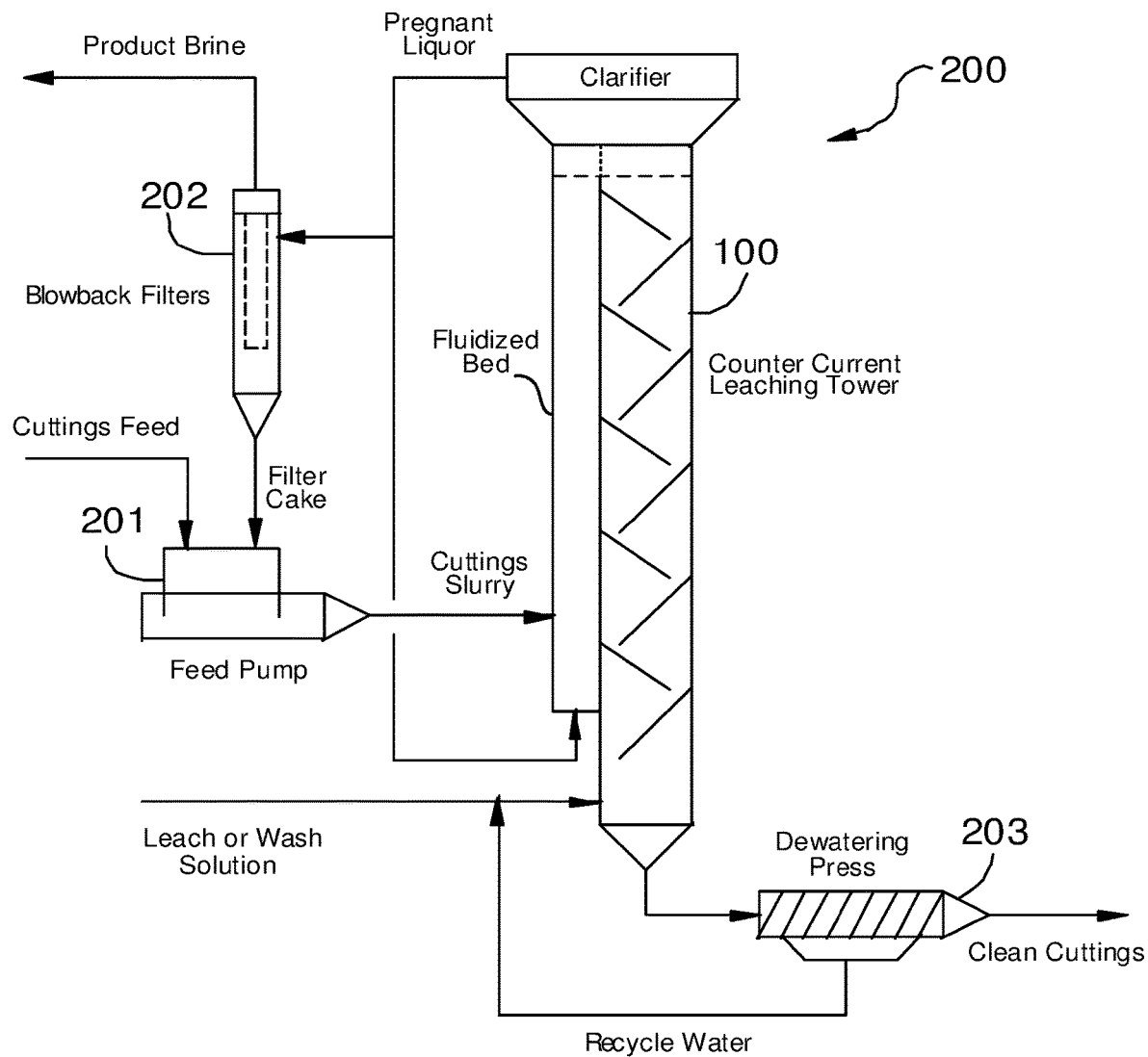
FIG. 2 shows an integrated process flow diagram using the counter-current solids leaching system for treating drill cuttings.
Figure 3:
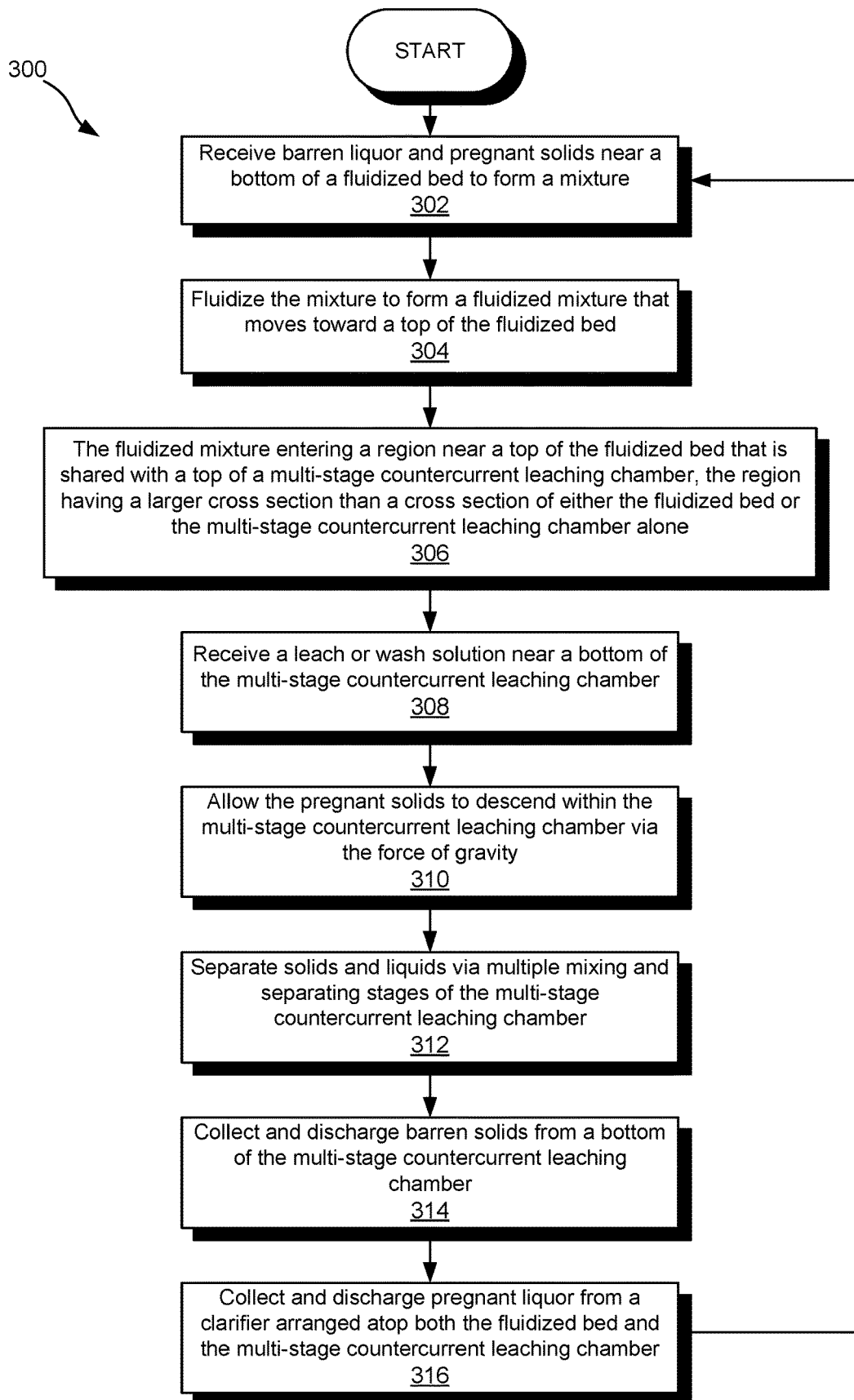
FIG. 3 shows one embodiment of a method for counter-current solids leaching.

FIG. 2 shows one embodiment of an integrated process flow diagram 200 for employing the counter-current flow solids leaching system 100 to remove dissolved solids from finely divided drilling residues, also referred to as cuttings.

Cuttings feed in the form of dry solids or solids present as paste, sludge, or slurry are fed to a feed pump 201 where they are comingled and mixed with filter cake from a blowback filter 202 before being fed to the previously disclosed counter-current flow solids leaching system 100.

Those skilled in the art will recognize that the feed pump 201, without limitation, may be selected from the group consisting of high-shear mixers, pug mills, mixing tanks, progressive cavity pumps, rotary lobe pumps, flexible impeller pumps, rotary valves, and centrifugal slurry pumps.

Pregnant liquor discharged from the counter-current flow solids leaching system 100 is filtered using a blow-back filter 202 to produce clarified product brine for beneficial use or disposal, plus a thickened filter cake that is recycled to the feed pump 201.

Those skilled in the art will recognize that the blow-back filter 202, without limitation, may be selected from the group consisting of bag filters, belt filters, filter presses, V-Sep filters, sintered metal filters, ceramic filters, deep bed filters, lamella thickeners, sedimentation clarifiers, electro-coagulation clarifiers, and centrifugal clarifiers.

Recycle of pregnant liquor to the feed pump and fluidized bed concentrates soluble salts in the recycled fluid and maximizes the concentration and specific gravity of the product brine. High specific gravity brines have value in the oil field. In addition, high-concentration brines exhibit reduced volume and reduced cost for transportation and off-site disposal via deep well injection.

Settled, barren solids exiting the bottom of the counter-current flow solids leaching system 100 may be dewatered using a dewatering screw press 203 or other dewatering equipment. Dewatering produces a reduced volume, reduced mass, stackable, easily handled and transported solid residue. Water thus removed from the barren solids may be comingled with the leach or wash solution fed to the leaching system 100 in order to reduce the total fresh solution required for operation of the system.

Those skilled in the art will recognize that the dewatering press 203, without limitation, may be selected from the group consisting of dewatering screw presses, belt filters, pressure filters, V-Sep filters, gas displacement dryers, and centrifugal separators.

Operational Experience

A prototype commercial countercurrent solids leaching system as shown in FIG. 2 has been operated on a drilling site in the Williston basin to treat salt water brine mud cuttings and other solid residues derived from horizontal drilling operations in the Bakken formation. The prototype commercial countercurrent solids leaching system demonstrated removal of 98.8% to 99.4% of chlorides from feed materials containing an average of 57,315 mg Cl$^-$/L, and at feed rates as much as 20% above the system design rating. Treated material exhibited chloride concentrations below the regulatory limit for surface application of 250 mg/kg.

The instant invention has been reduced to practice and successfully demonstrated at the prototype commercial scale throughput of 500 lbm/hr, and with feed material-to-fresh water mass ratios in the range from 1.2 to 4.6. Demonstration testing showed that the prototype countercurrent solids leaching system requires from 43% to 85% less fresh water when compared to conventional leaching techniques base on equivalent throughput and salt removal.

What is claimed is:

1. An apparatus for leaching fine solids, the apparatus comprising:
   a leaching chamber having:
      a top end;
      a bottom end;
      an input configured to receive a leach or wash solution;
      one or more regions for mixing and separation of liquid and solid phases; and
      an output configured to collect and discharge settled solids from the leaching chamber;
   a fluidized bed chamber with a top and bottom end, wherein the fluidized bed chamber is joined to the leaching chamber; and
   a clarifier chamber with a top and a bottom end, and joined at its bottom end to the top end of the leaching chamber and the top end of the fluidized bed chamber.

2. The apparatus of claim 1, wherein the fluidized bed chamber includes a pregnant solids input configured to receive a fluidizable slurry of pregnant solids, and wherein the fluidized bed chamber and the leaching chamber are separated by a shared partition wall furnished with an aperture through which solids can move from the fluidized bed chamber and into the leaching chamber.

3. The apparatus of claim 2, wherein said shared partition wall aperture is near a top of said shared partition wall, said aperture configured to allow transfer of solids at uniform mass flux over the area of the aperture, and from the fluidized bed chamber into the top end of the leaching chamber.

4. The apparatus of claim 1, wherein the input is a barren liquor input configured to receive barren liquor in the form of the leach or wash solution, and wherein the liquid and solid phases are countercurrently mixed and separated in the one or more regions for mixing and separation of liquid and solid phases, and the one or more regions further comprises an arrangement of inclined fixed plates.

5. The apparatus of claim 4, wherein said inclined fixed plates are arranged at an angle with a horizontal that is equal to or greater than an angle of repose of solids settling on the fixed plates.

6. The apparatus of claim 4, wherein said inclined fixed plates are affixed in an alternating array on two opposing inside walls of the leaching chamber, and spaced such that solids falling from at least a first of the plates will intercept an upper surface of a plate located below and opposite the at least a first of the plates.

7. The apparatus of claim 6, wherein the solids falling from the at least a first of the plates intercept the upper surface of the plate below the at least a first of the plates at a point on the upper surface of the plate below that is no greater than one-half of a length of the plate below measured from a plate precipice of the plate below.

8. The apparatus of claim 4, wherein given a vertical axis drawn from a bottom end of one of the plates through a point on another plate below and opposing the one of the plates, a distance along this vertical axis between a point where the vertical axis intersects the end of the one of the plates and the point on the another plate is less than 20% of a horizontal distance between the end of the one of the plates and a wall of the leaching chamber opposing the one of the plates.

9. The apparatus of claim 1, wherein the output is a barren solids output comprising a dewatering screw press.

10. The apparatus of claim 9, wherein the dewatering screw press provides barren liquor to the bottom end of the leaching chamber.

11. The apparatus of claim 1, wherein the leaching chamber is a multi-stage countercurrent leaching chamber.

12. The apparatus of claim 11, wherein the output is a barren solids output, and wherein the barren solids output collects and discharges the settled solids or barren solids from the bottom end of the multi-stage countercurrent leaching chamber.

13. The apparatus of claim 11, wherein the fluidized bed chamber is joined at its top end with the top end of the multi-stage countercurrent leaching chamber.

14. The apparatus of claim 1, wherein the output collects and discharges the settled solids from near a bottom end of the leaching chamber.

15. The apparatus of claim 1, wherein the fluidized bed chamber and the leaching chamber are joined within top halves of the fluidized bed chamber and the leaching chamber.

16. A method for leaching fine solids, the method comprising:
   receiving barren liquor and pregnant solids in a fluidized bed chamber to form a mixture;
   fluidizing the mixture to form a fluidized mixture that moves within the fluidized bed chamber;
   the fluidized mixture entering a region within the fluidized bed chamber that is shared with a leaching chamber;
   receiving a leach or wash solution via an input of the leaching chamber;
   allowing the pregnant solids to descend within the leaching chamber via gravity;
   separating solids and liquids via one or more mixing and separating stages of the leaching chamber;
   collecting and discharging barren solids from the leaching chamber; and
   collecting and discharging pregnant liquor from a clarifier chamber arranged atop both the fluidized bed and the leaching chamber.

17. The method of claim 16, wherein the region has a larger cross section than a cross section of either the fluidized bed chamber or the leaching chamber alone.

18. The method of claim 16, wherein the leaching chamber is a multi-stage countercurrent leaching chamber.

19. The method of claim 16, wherein the barren liquor and pregnant solids are received near a bottom end of the fluidized bed chamber, and wherein the fluidized bed chamber is joined at its top end with a top end of the leaching chamber.

20. An apparatus for leaching fine solids, the apparatus comprising:
   a leaching chamber having:
      a top end;
      a bottom end;
      an input configured to receive a leach or wash solution;
      one or more regions for mixing and separation of liquid and solid phases; and
      an output configured to collect and discharge settled solids from the leaching chamber;
   a fluidized bed chamber with a top and bottom end, and joined to the leaching chamber, the fluidized bed chamber including a pregnant solids input configured to receive pregnant solids and fluidizing liquor; and
   a clarifier chamber with a top and a bottom end, and joined at its bottom end to the top end of the leaching chamber and the top end of the fluidized bed chamber.

* * * * *